United States Patent
Enami et al.

(10) Patent No.: US 11,537,287 B2
(45) Date of Patent: Dec. 27, 2022

(54) ELECTRONIC DEVICE, METHOD, AND NON-TRANSITORY RECORDING MEDIUM

(71) Applicants: Eiji Enami, Kanagawa (JP); Toshihiko Kawa, Tokyo (JP); Takeshi Matsushita, Tokyo (JP)

(72) Inventors: Eiji Enami, Kanagawa (JP); Toshihiko Kawa, Tokyo (JP); Takeshi Matsushita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/395,485

(22) Filed: Aug. 6, 2021

(65) Prior Publication Data
US 2022/0083217 A1    Mar. 17, 2022

(30) Foreign Application Priority Data
Sep. 14, 2020   (JP) .............................. JP2020-154119

(51) Int. Cl.
G06F 3/048        (2013.01)
G06F 3/04886    (2022.01)
G06F 3/0482      (2013.01)

(52) U.S. Cl.
CPC ........ *G06F 3/04886* (2013.01); *G06F 3/0482* (2013.01)

(58) Field of Classification Search
CPC .............. G06F 3/04886; G06F 3/0482; G06F 2203/04802; G06F 3/04842; G06F 3/04847; G06F 3/04883; G06F 3/04892; G06F 3/0236
See application file for complete search history.

(56) References Cited

U.S. PATENT DOCUMENTS

| | | |
|---|---|---|
| 2007/0057961 A1 | 3/2007 | Enami et al. |
| 2008/0231878 A1 | 9/2008 | Yano et al. |
| 2009/0077400 A1 | 3/2009 | Enami et al. |
| 2009/0167706 A1* | 7/2009 | Tan ..................... G06F 3/04886 345/173 |
| 2010/0033748 A1 | 2/2010 | Enami et al. |

(Continued)

FOREIGN PATENT DOCUMENTS

| | | |
|---|---|---|
| JP | 10-133524 | 5/1998 |
| JP | 2003-084777 | 3/2003 |

(Continued)

*Primary Examiner* — Thanh T Vu
(74) *Attorney, Agent, or Firm* — Xsensus LLP

(57) ABSTRACT

An electronic device includes an input screen including: a dial keyboard on which multiple characters are annularly arranged for selection by an operator; an input area into which a character selected from the multiple characters is input at an input position; and a movement key for allowing the operator to move the input position at which the selected character is to be input in the input area to determine the input position. The dial keyboard sequentially displays the multiple characters for selection by the operator on the dial keyboard, according to an operation on the dial keyboard by the operator. The input area displays the selected character at the input position determined in response to an operation on the movement key, in response to a selection of a character from the multiple characters by the operator.

22 Claims, 10 Drawing Sheets

(56) References Cited

U.S. PATENT DOCUMENTS

| | | |
|---|---|---|
| 2010/0231553 A1 | 9/2010 | Yabuuchi et al. |
| 2011/0050579 A1* | 3/2011 | Takahashi ............. G06F 3/0236 345/168 |
| 2011/0167375 A1* | 7/2011 | Kocienda ............. G06F 3/0236 715/773 |
| 2012/0044169 A1 | 2/2012 | Enami |
| 2013/0027743 A1 | 1/2013 | Enami |
| 2020/0249811 A1* | 8/2020 | Lemay ................... G06Q 10/10 |

FOREIGN PATENT DOCUMENTS

| | | |
|---|---|---|
| JP | 2005-044031 | 2/2005 |
| JP | 2006-228006 | 8/2006 |
| JP | 2006-243550 | 9/2006 |
| JP | 2007-004310 | 1/2007 |
| JP | 2007-080108 | 3/2007 |
| JP | 2008-203949 | 9/2008 |
| JP | 2008-204242 | 9/2008 |
| JP | 2008-229990 | 10/2008 |
| JP | 2009-070301 | 4/2009 |
| JP | 2009-258882 | 11/2009 |
| JP | 2009-267974 | 11/2009 |
| JP | 2010-055207 | 3/2010 |
| JP | 2010-074374 | 4/2010 |
| JP | 2010-093777 | 4/2010 |
| JP | 2010-218175 | 9/2010 |
| JP | 2010-244520 | 10/2010 |
| JP | 2010-287148 | 12/2010 |
| JP | 2011-034422 | 2/2011 |
| JP | 2011-059998 | 3/2011 |
| JP | 2011-082874 | 4/2011 |
| JP | 2012-043214 | 3/2012 |
| JP | 2012-114694 | 6/2012 |
| JP | 2013-027029 | 2/2013 |
| JP | 2013-215000 | 10/2013 |
| JP | 2015-028807 | 2/2015 |
| JP | 2016-042390 | 3/2016 |
| JP | 2017-099020 | 6/2017 |

* cited by examiner

FIG. 7

| ⋮ | ⋮ | ⋮ | ⋮ |
|---|---|---|---|
| W | w | 6 | ` |
| X | x | 7 | { |
| Y | y | 8 | \| |
| Z | z | 9 | } |
| A | a | 0 | ~ |
| B | b | 1 | ! |
| C | c | 2 | " |
| D | d | 3 | # |
| E | e | 4 | $ |
| F | f | 5 | % |
| G | g | 6 | & |
|   |   |   | ' |
|   |   |   | ( |
|   |   |   | ) |
| ⋮ | ⋮ | ⋮ | ⋮ |

FIG. 11

| | | | |
|---|---|---|---|
| ⋮ | ⋮ | ⋮ | ⋮ |
| W | w | 6 | ` |
| X | x | 7 | { |
| Y | y | 8 | \| |
| Z | z | 9 | } |
| | | | ~ |
| | | | |
| A | a | 0 | ! |
| B | b | 1 | " |
| C | c | 2 | # |
| D | d | 3 | $ |
| E | e | 4 | % |
| F | f | 5 | & |
| G | g | 6 | ' |
| | | | ( |
| | | | ) |
| ⋮ | ⋮ | ⋮ | ⋮ |

FIG. 12A
FIG. 12B
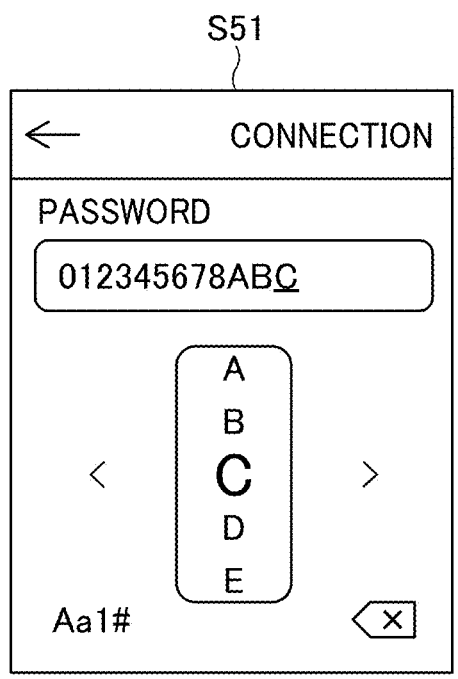
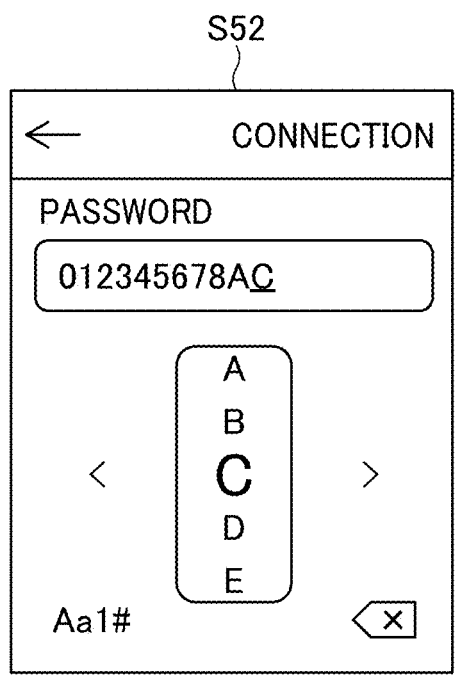

ELECTRONIC DEVICE, METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-154119, filed on Sep. 14, 2020, in the Japan Patent Office, the entire disclosure of which is hereby incorporated by reference herein.

BACKGROUND

Technical Field

Embodiments of the present disclosure relate to an electronic device, a method for controlling display, and a non-transitory recording medium.

Related Art

Conventionally, there are known software keyboards in which a keyboard used for inputting characters is implemented by software on a screen of a computer. Such a screen for displaying a software keyboard needs a certain size, and the software keyboard might deteriorate its operability on a screen especially when the screen is small in size.

SUMMARY

At least one embodiment includes an electronic device including an input screen including: a dial keyboard on which multiple characters are annularly arranged for selection by an operator; an input area into which a character selected from the multiple characters is input at an input position; and a movement key for allowing the operator to move the input position at which the selected character is to be input in the input area to determine the input position. The dial keyboard sequentially displays the multiple characters for selection by the operator on the dial keyboard, according to an operation on the dial keyboard by the operator. The input area displays the selected character at the input position determined in response to an operation on the movement key, in response to a selection of a character from the multiple characters by the operator.

At least another embodiment includes a method for controlling display including: displaying an input screen including a dial keyboard on which multiple characters are annularly arranged for selection by an operator, an input area into which a character selected from the multiple characters is input at an input position, and a movement key for allowing the operator to move the input position at which the selected character is to be input in the input area to determine the input position; sequentially displaying the multiple characters for selection by the operator on the dial keyboard, according to an operation on the dial keyboard by the operator; and in response to a selection of a character from the multiple characters by the operator, displaying the selected character at the input position determined in response to an operation on the movement key, in the input area.

At least still another embodiment includes a non-transitory recording medium storing a computer-readable code for controlling a computer system to carry out a method for controlling display, the method including: displaying an input screen including a dial keyboard on which multiple characters are annularly arranged for selection by an operator, an input area into which a character selected from the multiple characters is input at an input position, and a movement key for allowing the operator to move the input position at which the selected character is to be input in the input area to determine the input position; sequentially displaying the multiple characters for selection by the operator on the dial keyboard, according to an operation on the dial keyboard by the operator; and in response to a selection of a character from the multiple characters by the operator, displaying the selected character at the input position determined in response to an operation on the movement key, in the input area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is an illustration of characters arranged annularly according to an embodiment of the present disclosure;

FIG. 11 is an illustration of characters arranged annularly according to an embodiment of the present disclosure; and FIGS. 12A and 12B are illustrations of the input screen of the electronic device, on which a character is being deleted, according to an embodiment of the present disclosure.

Figure 1:
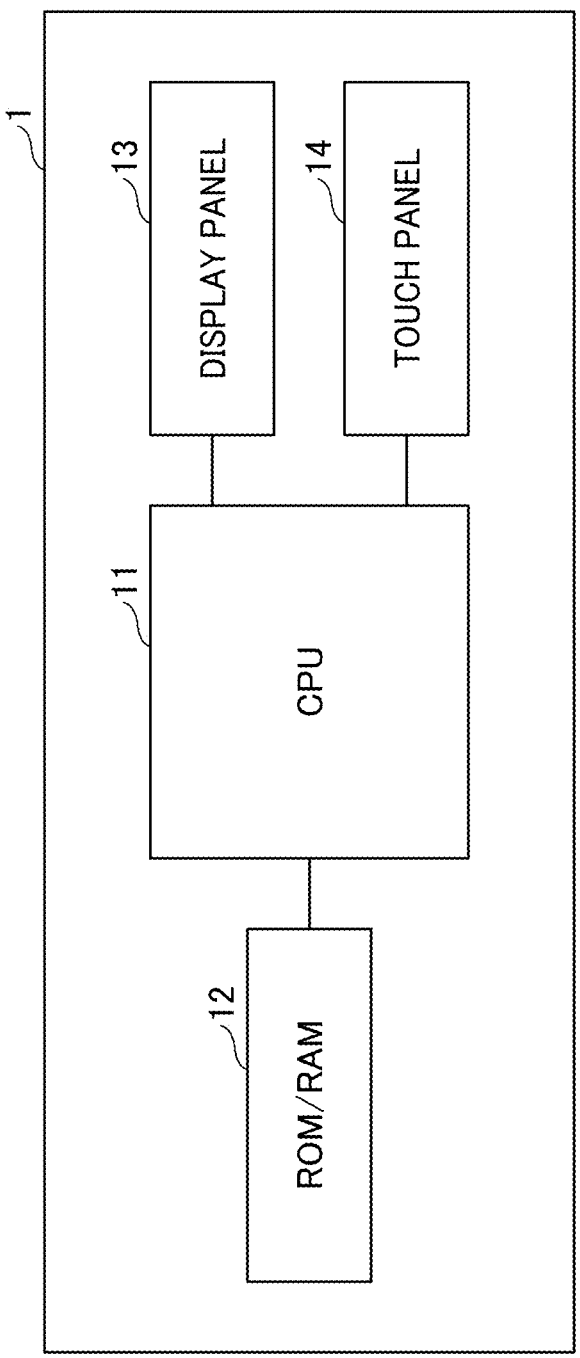
FIG. 1 is an illustration of a configuration of an electronic device according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

As described above, if a software keyboard is displayed on a screen, display contents may be hidden by the software keyboard especially when the screen in small. In view of this, in the present disclosure, a keyboard that only requires a smaller display space than the conventional software keyboard, while allowing high user operability is described.

According to one or more embodiments of the present disclosure, a software keyboard on which multiple characters are annularly arranged is referred to as a "dial keyboard". The dial keyboard sequentially displays each of the multiple characters in accordance with an operation of an operator. When the dial keyboard displayed is displayed on the touch panel, the characters are sequentially displayed on the screen one by one in response to an operation such as a swipe on the touch panel by the operator. In such a dial keyboard, the operator selects a character desired to be input, from the multiple characters sequentially displayed by the dial keyboard.

The characters are, for example, alphabets, numbers, and symbols, but are not limited thereto.

In the present disclosure, a case where a password is input to a digital camera to connect the digital camera with a Wi-Fi (registered trademark) router is described. The embodiments of the present disclosure are applicable to an example case in which any desired character string is input to a user interface, such as that receives a user input, displayed by any desired electronic device.

FIG. 1 is an illustration of a configuration of an electronic device (1) according to an embodiment of the present disclosure. The electronic device (1) includes a central processing unit (CPU) 11, a read only memory (ROM)/a random access memory (RAM) 12, a display panel 13, and a touch panel 14. The touch panel 14 is disposed on the display panel 13. The following describes these components.

The CPU 11 controls information stored in a memory of the electronic device (1).

The ROM/RAM 12 stores a control program and data to be used by the CPU 11 in operation.

The CPU 11 selects content to be displayed, from multiple screens of the electronic device (1) and transmits the selected display screen to the display panel 13 to display an operation screen according to the state of the electronic device. In response to an input to the touch panel 14 by the operator, the touch panel 14 transmits an electrical signal to the CPU 11. The CPU 11 determines the next operation and generates a new display screen for a change in the content to be displayed, transmitting the generated display screen to the display panel 13. The screen includes, for example, a shooting processing screen, a screen for transition to a camera setting menu, and a screen displaying a shot image.

The electronic apparatus (1) is, for example, a digital camera, but is not limited thereto, and, in some examples, is a smartphone or a tablet terminal. Examples of the electronic device (1) include, but not limited to, an image forming apparatus such as a multifunction peripheral/printer/product (MFP), an output device such as a projector (PJ), an interactive whiteboard (IWB; an electronic whiteboard having mutual communication capability), and a digital signage, a head-up display (HUD), an industrial machine, an imaging device, a sound collecting device, a medical device, a networked home appliance, an automobile (connected car), a laptop computer (PC), a mobile phone, a game console, a personal digital assistant (PDA), a wearable PC and a desktop PC.

Figure 2:
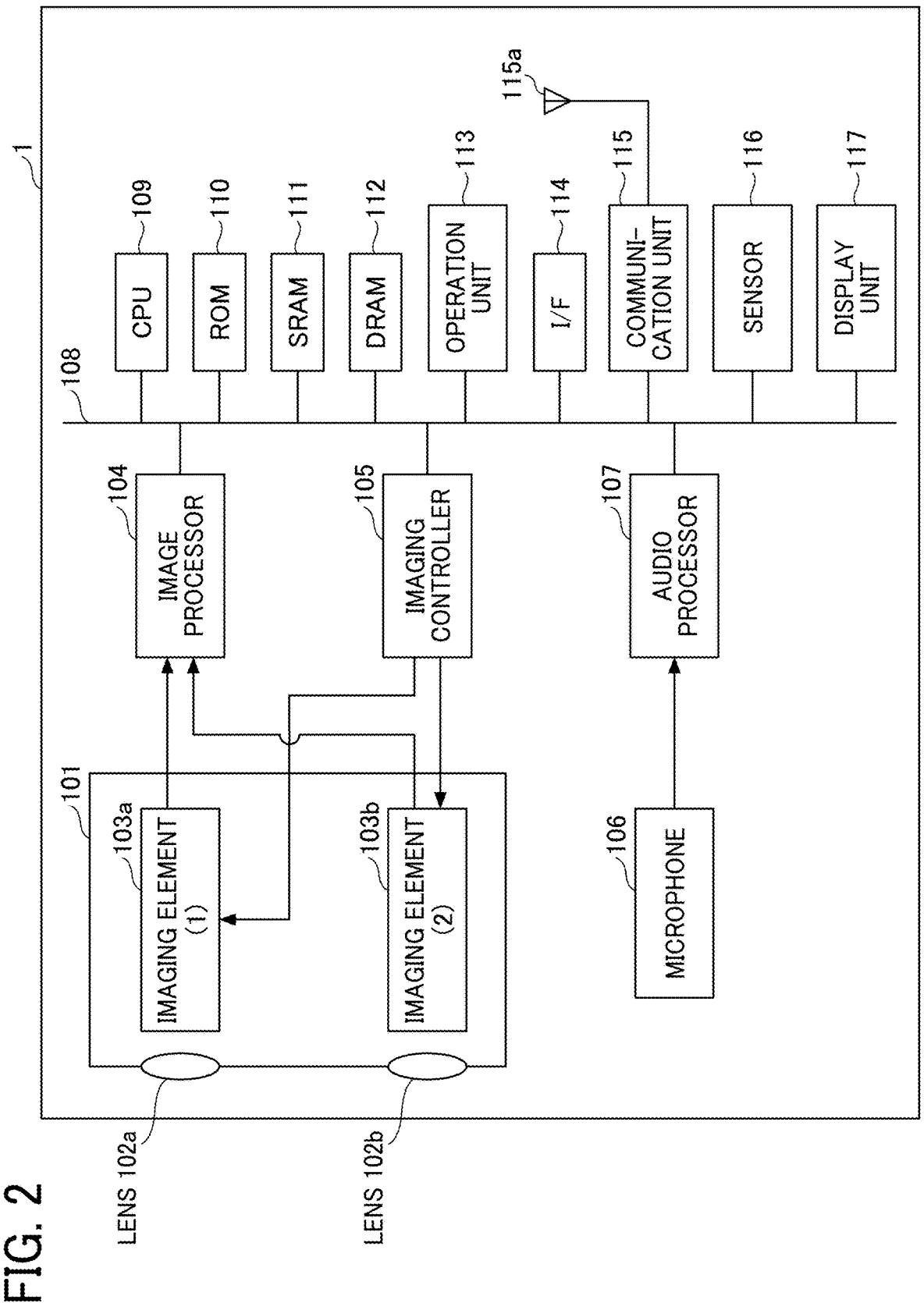
FIG. 2 is a hardware block diagram of a spherical-image capturing device as an example of the electronic device according to an embodiment of the present disclosure.

FIG. 2 is a hardware block diagram of a spherical image capturing device 1 as an example of the electronic device (1) according to an embodiment of the present disclosure. The spherical image capturing device 1 includes a display unit 117. The display unit 117 serves as the display panel 13 and the touch panel 14 in FIG. 1.

The following describes a case in which the spherical image capturing device 1 is a full-view spherical (omnidirectional) image capturing device having two imaging elements. However, the spherical image capturing device 1 includes any suitable number of imaging elements, providing that it includes at least two imaging elements. In addition, the spherical image capturing device 1 is not necessarily an image capturing device dedicated to omnidirectional image capturing. Alternatively, an external omnidirectional image capturing unit may be attached to a general-purpose digital camera or a smart phone to implement an image capturing device 1 having substantially the same function as that of the spherical image capturing device 1.

As illustrated in FIG. 2, the spherical image capturing device 1 includes an imaging unit 101, an image processor 104, an imaging controller 105, a microphone 106, an audio processor 107, a central processing unit (CPU) 109, a read only memory (ROM) 110, a static random access memory (SRAM) 111, a dynamic random access memory (DRAM) 112, the operation unit 113, an interface (I/F) 114 for connecting with the external device, a communication unit 115, an antenna 115a, an acceleration and orientation sensor 116, and a display unit 117.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b, respectively. The imaging elements 103a and 103b each include an image sensor such as a complementary metal oxide semiconductor (CMOS) sensor and a charge-coupled device (CCD) sensor, a timing generation circuit, and a group of registers. The image sensor converts an optical image formed by the wide-angle lenses 102a and 102b into electric signals to output image data. The timing generation circuit generates, for example, horizontal or vertical synchronization signals and pixel clocks for the image sensor. Various commands and parameters for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 107 are each connected to the CPU 109 via a bus 108. Further, the ROM 110, the SRAM 111, the DRAM 112, the operation unit 113, an interface (I/F) 114 for connecting with the external device, the communication unit 115, and the acceleration and orientation sensor 116 are also connected to the bus 108.

The image processor 104 acquires image data from each of the imaging elements 103a and 103b via the serial I/F bus and performs predetermined processing on each image data. Thereafter, the image processor 104 combines these image data to generate data of the equirectangular projection image.

The imaging controller 105 usually functions as a master device while the imaging elements 103a and 103b each usually functions as a slave device. The imaging controller 105 sets, for example, commands in the group of registers of the imaging elements 103a and 103b via the serial I/F bus such as the I2C bus. The imaging controller 305 receives various commands from the CPU 109. The imaging control unit 105 also uses the I2C bus to capture status information of the registers in the imaging elements 103a and 103b, and sends the status information to the CPU 109.

The imaging controller 105 instructs the imaging elements 103a and 103b to output the image data at a time when a shutter button of the operation unit 113 is pressed. In some cases, the spherical image capturing device 1 is capable of displaying a preview image on a display (e.g., a display of the smart phone) or displaying a moving image (movie). In case of displaying movie, the image data are continuously output from the imaging elements 103a and 103b at a predetermined frame rate (frames per minute).

Furthermore, the imaging controller 105 operates in cooperation with the CPU 109 to synchronize the time when the imaging element 103a outputs image data and the time when the imaging element 103b outputs the image data.

The microphone 106 converts sounds to audio data (signal). The audio processor 107 acquires the audio data output from the microphone 106 via an I/F bus and performs predetermined processing on the audio data.

The CPU 109 controls entire operation of the spherical image capturing device 1, for example, by performing predetermined processing. The ROM 110 stores various programs for execution by the CPU 109. Each of the SRAM 111 and the DRAM 112 operates as a work memory to store programs loaded from the ROM 110 for execution by the CPU 109 or data in current processing. More specifically, in one example, the DRAM 112 stores image data currently processed by the image processor 104 and data of the equirectangular projection image on which processing has been performed.

The operation unit 113 collectively refers to various operation keys, such as a shutter button. The user operates the operation unit 113 to input various image capturing (photographing) modes or image capturing (photographing) conditions.

The I/F 114 is an interface that connects the computer system to various external devices. Examples of the external devices include, but are not limited to, a universal serial bus (USB) memory and a personal computer (PC). The data of the equirectangular projection image, which is stored in the DRAM 112, is stored in the external medium via the I/F 114 or transmitted to the external device such as the smart phone via the I/F 114, at any desired time.

The communication unit 115 communicates data with the external device such as the smart phone via the antenna 115a of the spherical image capturing device 1 by short-range wireless communication such as Wi-Fi, NFC, and Bluetooth (registered trademark). The communication circuit 115 is also capable of transmitting the data of equirectangular projection image to the external device such as the smart phone.

The acceleration and orientation sensor 116 calculates an orientation of the spherical image capturing device 1 from the Earth's magnetism to output orientation information. This orientation and tilt information is an example of related information, which is metadata described in compliance with Exif. This information is used for image processing such as image correction of captured images. The related information also includes a date and time when the image is captured by the spherical image capturing device 1, and a size of the image data. The acceleration and orientation sensor 116 detects the change in tilt (roll, pitch, yaw) with movement of the special image capturing device 1.

The change in angle is one example of related information (metadata) described in compliance with Exif. This information is used for image processing such as image correction of captured images. The acceleration and orientation sensor 116 further detects acceleration in three axial directions. The spherical image capturing device 1 calculates its position (an angle with respect to the direction of gravity), based on the acceleration detected by the acceleration and orientation sensor 116. With the acceleration and orientation sensor 116, the special image capturing device 1 is capable to correct images with high accuracy.

Figure 3:
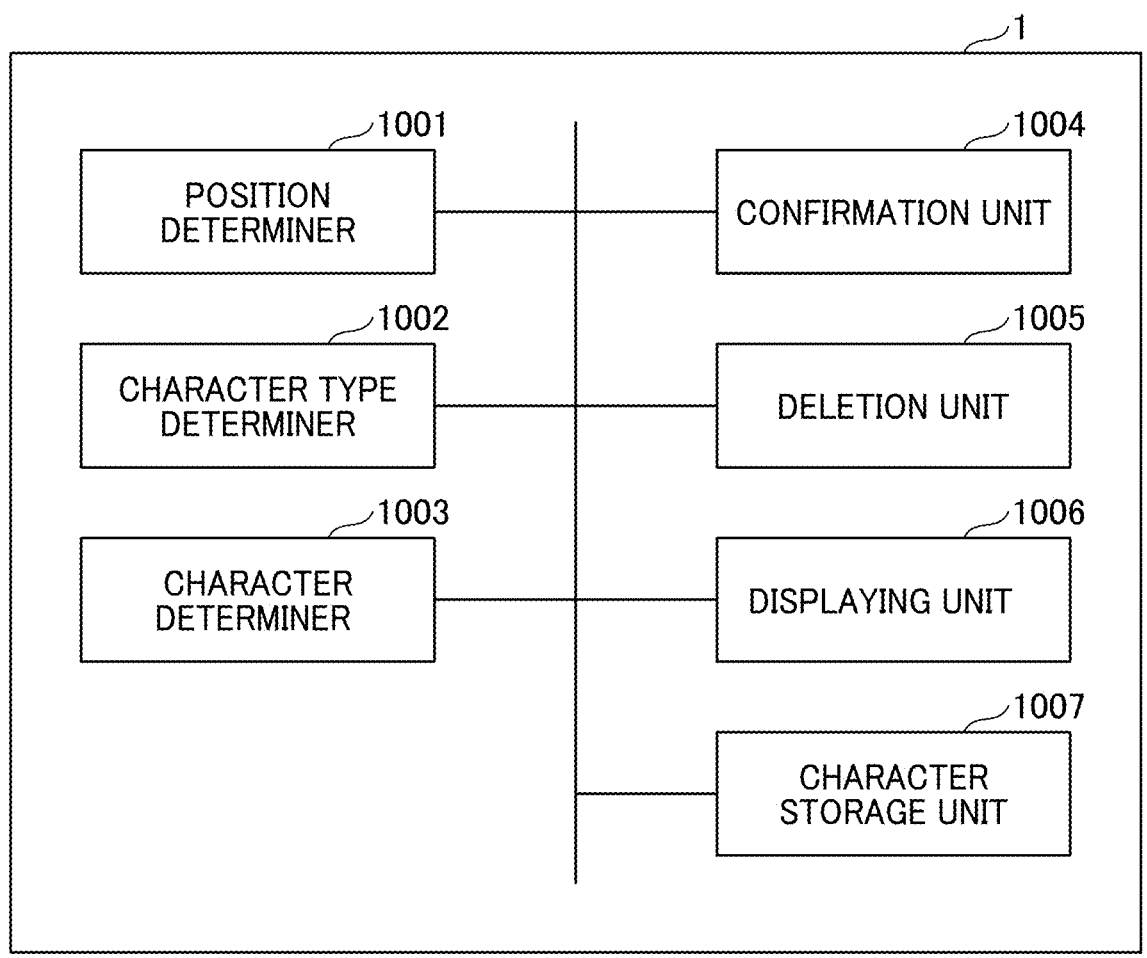
FIG. 3 is a functional block diagram of the electronic device according to an embodiment of the present disclosure.

FIG. 3 is a functional block diagram of the electronic device (1) according to an embodiment of the present disclosure. The electronic device (1) includes a position determiner 1001, a character type determiner 1002, a character determiner 1003, a confirmation unit 1004, a deletion unit 1005, a displaying unit 1006, and a character storage unit 1007. The electronic device (1) executes the program to implement the position determiner 1001, the character type determiner 1002, the character determiner 1003, the confirmation unit 1004, the deletion unit 1005, the displaying unit 1006, and the character storage unit 1007. The following describes these functions.

The position determiner 1001 determines a position (i.e., an input position) at which a character is to be input, in response to an operation on the touch panel, which is particularly a cursor-movement key operation of moving a cursor for indicating that input position.

The character type determiner 1002 determines a character type (for example, an alphabet, a number, or a symbol) of the character to be input in response to an operation on the touch panel (specifically, a switch key operation of switching the character type). Notably, with absence of the operation on the touch panel, the character type determiner 1002 determines a predetermined character type (i.e., default character type) as the character type of the character to be input.

The character determiner 1003 determines a character to be input in response to an operation on the touch panel (specifically, a dial-keyboard operation). Specifically, the character determiner 1003 determines, as a character to be input, a character selected by the operator from among the multiple characters sequentially displayed by the dial keyboard in response to an operation (for example, an operation such as a swipe) on the touch panel.

The confirmation unit 1004 confirms (e.g., store) a character string selected by using the dial keyboard in response to the operation on the touch panel (specifically, pressing of a confirmation key), and ends the input process.

The deletion unit 1005 deletes an input character in response to an operation on the touch panel (specifically, pressing of a deletion key). Specifically, the deletion unit 1005 deletes a character for which a deletion instruction is made on the touch panel by the operator.

The displaying unit 1006 displays a screen (hereinafter, referred to as an input screen 100) to input a character string of multiple characters on the display panel of the electronic device (1). Specifically, the input screen includes an input area for displaying an input character (a character that has been input), a movement key for moving a cursor indicating a position at which a character is to be input in the input area, a dial keyboard, a switch key for switching the character type of the dial keyboard, a confirmation key, and a deletion key. The details of these keys are described later.

The character storage unit 1007 stores in any desired memory such as the SRAM 111 or the DRAM 112, for each character type, information on the characters of each character type and the order in which the characters are annularly arranged.

Figure 4:
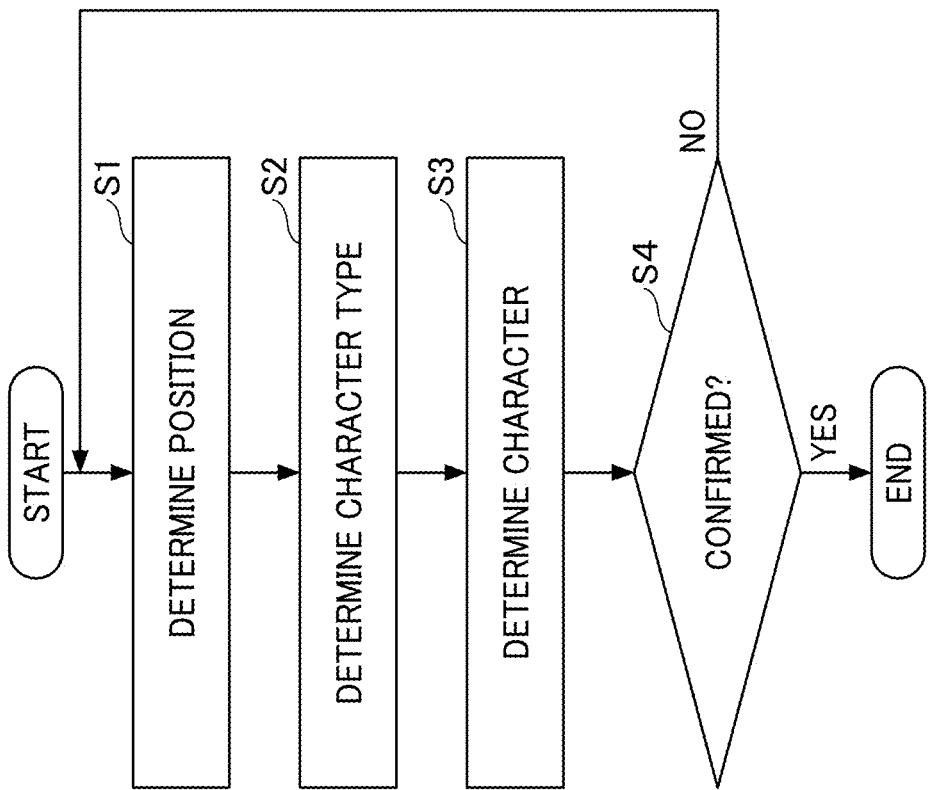
FIG. 4 is a flowchart of input processing according to an embodiment of the present disclosure.

FIG. 4 is a flowchart of input processing according to an embodiment of the present disclosure.

In step 1 (S1), the position determiner 1001 determines a position for inputting a character in response to an operation on the touch panel.

In step 2 (S2), the character type determiner 1002 determines the character type of a character to be input, in response to an operation on the touch panel.

In step 3 (S3), the character determiner 1003 determines a character to be input in accordance with an operation on the touch panel. Specifically, in response to an operation on the touch panel, the character determiner 1003 determines a character selected by the operator from among multiple characters sequentially displayed by the dial keyboard as a character to be input. In other words, the operator inputs the character determined in step 3 (S3) of the character type determined in step 2 (S2) at the input position, which is determined in step 1 (S1).

In step 4 (S4), the confirmation unit 1004 determines whether a confirmation instruction has been made on the touch panel by the operator. When the confirmation instruction has been made (i.e., a confirmation key has been pressed) (YES in step S4), the electronic device confirms the character string input through steps S1 to S3 and ends the input processing. When the confirmation instruction has not been made (NO in step S4), the process returns to the step S1.

Such processes through the step S1 to the step S3 of determining a position to input a character; determining a character type for a character to be input; and determining a character to be input are repeated for the number of characters in the character string.

Although the case where any desired number of characters is input has been described above, the confirmation key is not to be pressed for a predetermined number of characters to be input, and inputting the characters ends when the predetermined number of characters are input in step S3.

Figure 5:
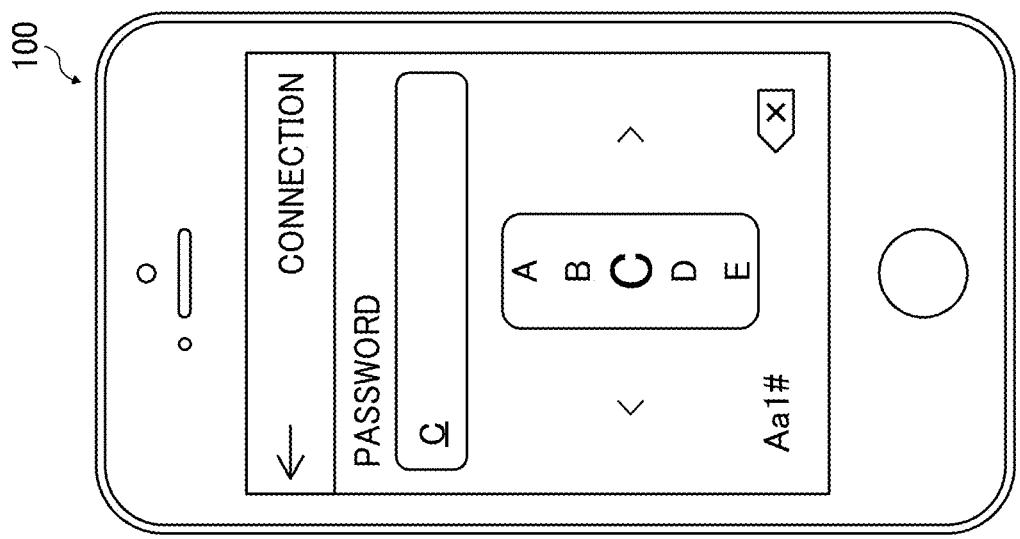
FIG. 5 is an illustration of a screen displayed on the electronic device according to an embodiment of the present disclosure.

FIG. 5 is an illustration of a screen displayed on the electronic device (1) according to an embodiment of the present disclosure. As illustrated in FIG. 5, for example, a screen (input screen) for inputting a character string of multiple characters is displayed on a display panel of a smartphone, which is an example of the electronic device (1). Although the following description is given with the display panel of the smartphone as an example, the electronic device provided with the display panel is not limited to the smartphone. Examples of the electronic device include an image capturing device such as the spherical image capturing device 1 described above, a digital camera, and a single-lens reflex digital camera, and the above-described examples of the electronic devices.

Hereinafter, a screen (input screen) for inputting a character string of multiple characters is described in detail with reference to FIGS. 6 to 12.

First Embodiment

Figure 6C:
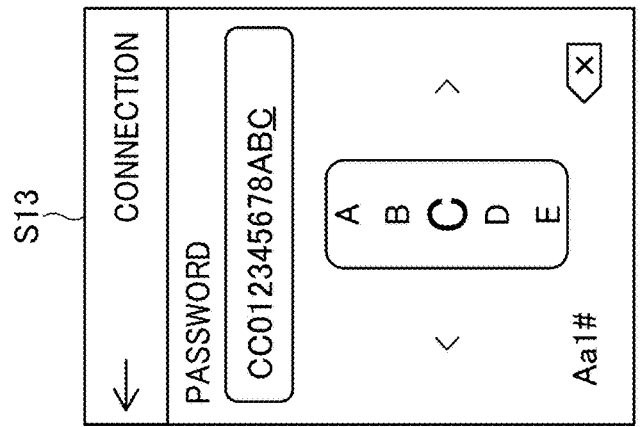
FIGS. 6A, 6B, and 6C are illustrations of an input screen, onto which characters are being input, displayed on the electronic device according to an embodiment of the present disclosure.
Figure 6B:
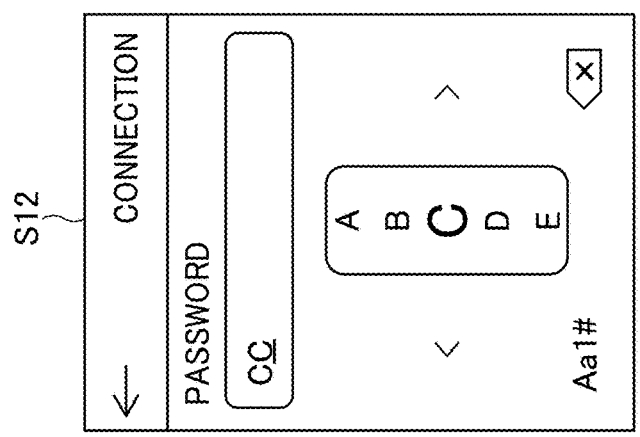
Figure 6A:
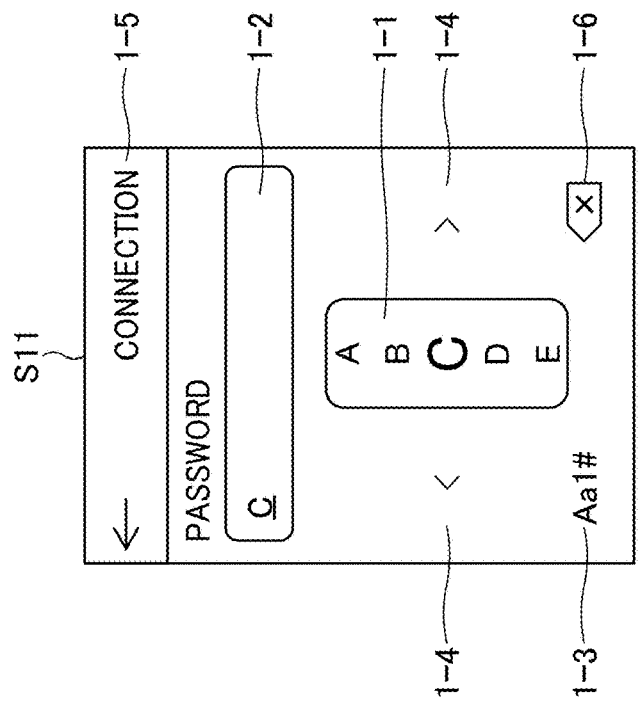

FIGS. 6A, 6B, and 6C are illustrations of an input screen, onto which characters are being input, displayed on the electronic device (1) according to an embodiment of the present disclosure. As illustrated in FIGS. 6A, 6B, and 6C, the input screen includes a dial keyboard 1-1 for an operator to select a character, an input area 1-2 (i.e., an area in which a character/characters selected from the multiple characters is/are input) for displaying an input character, a switch key 1-3 for switching character types, movement keys 1-4 for moving a position at which a currently-selected character is input (a move-right key for moving the position to the right and a move-left key for moving the position to the left), a confirmation key 1-5 for confirming a character string selected from the characters in the dial keyboard to make an instruction for the next process (i.e., a key for confirming a currently-selected character displayed on the dial keyboard as the last character to be input to the input area 1-2. The confirmation key 1-5 is, for example, a key for connecting the digital camera (an example of the electronic device) with the Wi-Fi router), and a deletion key 1-6 for instructing deletion of the character input.

In FIGS. 6A, 6B, and 6C, the position to input a character is indicated by a cursor, and the movement keys 1-4 is used to move the cursor to move the position to input a character. In the input screen of FIGS. 6A, 6B, and 6C, a horizontally-written character string is input as any desired character string. In the input area 1-2 of FIGS. 6A, 6B, and 6C, the characters of the character string are sequentially input to the input area 1-2 in the direction from the left to the right of the drawing sheet. In other words, the first character is on the leftmost of the input area 1-2, and the last character is on the right relative to the first character. For the two movement keys 1-4 in FIGS. 6A, 6B, and 6C, operating the left one of the movement keys 1-4 moves the position, at which a character is input, toward the left, and operating the other one (the right movement key) moves the position, at which a character is input, toward the right. In the present disclosure, the case in which the characters are horizontally written is described. However, in some cases, the characters are vertically written (input).

Figure 7:
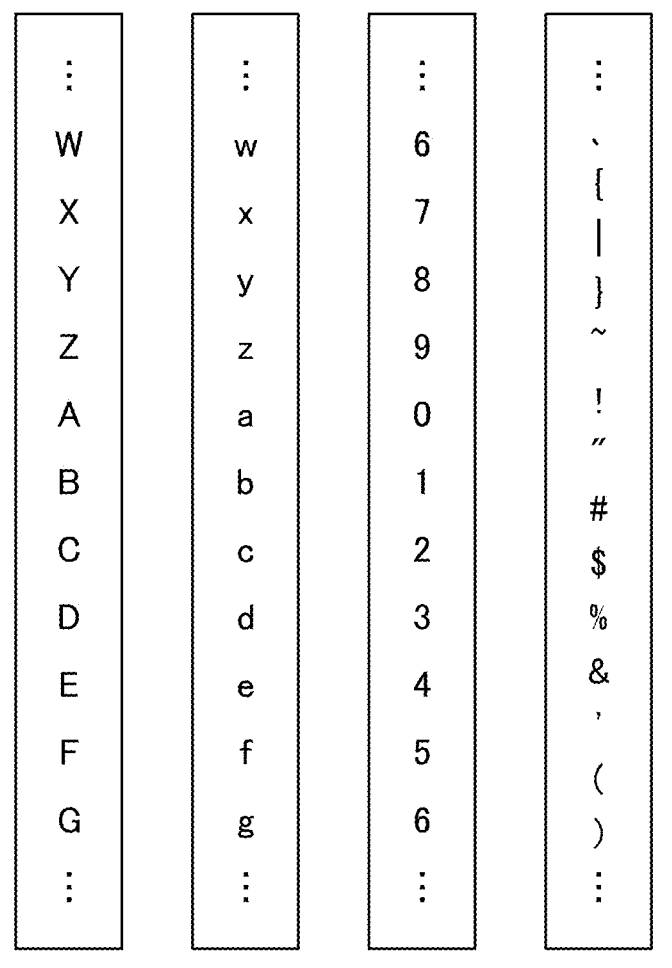

The characters displayed by the dial keyboard 1-1 have an annular structure as illustrated in FIG. 7. FIG. 7 is an illustration of characters (e.g., uppercase alphabetic characters, lowercase alphabetic characters, numbers, and symbols) arranged annularly according to an embodiment of the present disclosure.

For alphabet characters, the characters are arranged in the order of A to Z, and A follows Z. The input screen displays the character selected by the operator (i.e., the selected character) and other characters followed by and following the selected character, which are approximately 5 to 7 characters in total. Operating the touch panel to rotate the dial keyboard in the vertical direction by the operator repeatedly displays the character "A" again after displaying the characters in the order of A to Z. Reversely rotating the dial keyboard by the operator repeatedly displays the character "Z" after displaying the characters in the order of Z to A.

For the numbers, the numbers are arranged in order of 0 to 9, and "0" follows "9". Notably, the same applies to the symbols.

A method of selecting a character to be input by the operator involves sliding the dial keyboard 1-1 along the direction in which the characters are arranged while touching a portion of the dial keyboard 1-1 to display a desired character, that is, a currently-selected character at the center of the characters displayed (arranged) on the dial keyboard 1-1. In this case, preferably, the currently-selected character is displayed in bold, in a different color from the other characters, or in a bigger size than the other characters to clearly indicate which character is currently selected, to the operator.

As described above, the dial keyboard 1-1, which displays only some of the characters annularly arranged, needs a smaller display area. With this configuration, the display panel 13 with a small screen can display the dial keyboard 1-1. In some examples, the dial keyboard 1-1 displays only a currently-selected character instead of displaying the currently-selected character and other characters followed by and following the currently-selected character. This configuration enables a further reduction in the display area.

The input area 1-2 for displaying an input character displays a character input by using the dial keyboard 1-1. The input area 1-2 also displays a character being currently selected by using the dial keyboard 1-1. The currently-selected character is displayed at the position of the cursor.

The operator presses the switch key 1-3 to switch the character type of the character to be input. The order in which the character types are switched is preferably the order in which the character types are displayed on the switch key (in the example of FIGS. 6A, 6B, and 6C, the character types are arranged in order of alphabets (uppercase letters), alphabets (lowercase letters), numbers, and symbols). Further, when the character type changes between uppercase letters and lowercase letters of the alphabet, only the uppercase letters and lowercase letters of the same alphabet are changed for the operator's convenience.

Using the switch key 1-3 to switch the character type of the characters to be selected the dial keyboard 1-1 eliminates a need for displaying such character types on the dial keyboard 1-1, which enables a reduction in the display area.

The operator moves the cursor using at least one of the movement keys 1-4 (a left-movement key or a right-movement key), and determines the character that is currently selected on the dial keyboard 1-1 (i.e., the character determiner 1003 determines the character, which is also called "input has been completed") as a character that has been input at a previous input position. Pressing the confirmation key by the operator confirms (e.g., save) the character string including a string of characters that have been input from the dial keyboard 1-1 and the currently selected character on the dial keyboard 1-1. Hereinafter, an example of a screen when a character and a character string are confirmed is described with reference to FIGS. 6A, 6B, and 6C.

In step 11 (S11) illustrated in FIG. 6A, the CPU selects a character in response to an operation on the dial keyboard 1-1. In the example of FIG. 6A, the first character "C" is selected. Next, the CPU detects that the cursor is moved by the right-movement key. Then, the CPU determines the character (i.e., the first character "C") selected in the step 11 (S11) as the character to be input. At this time, the CPU may store the input character in a local memory. In other words, the character selected in S11 has been input, which is followed by the state of step 12 (S12) in FIG. 6B.

In step 12 (S12) in FIG. 6B, another character is input in the same manner as in the step (S11). Thereafter, the input of a character is repeated, which is followed by the state of step 13 (S13) in FIG. 6C. In step 13 (S13) in FIG. 6C, all the characters have been input through the above-described input operation. In other words, an input of the character string has been completed.

In step 13 (S13) in FIG. 6C, it is detected that the confirmation key, which is the CONNECTION key in the example of FIG. 6C, is pressed. Then, the confirmation unit 1004 confirms the character string "CC012345678ABC" including the input character string and the currently selected character. The confirmed character string may be stored in a local memory to be used for later operation.

Hereinafter, characters displayed when the cursor is moved is described with reference to FIGS. 6A, 6B, and 6C and FIGS. 8A, 8B, and 8C.

As illustrated in FIGS. 6A, 6B, and 6C, in at least one embodiment, the input area 1-2 displays the same character as the previously input character, at the position to which the cursor is moved where there is a blank space for inputting a character, after the previously input character has been determined and a next character is to be input. In other words, in the example of FIGS. 6A, 6B, and 6C, when the cursor is moved to the right from the state of S11 where "C" has been input, the input area 1-2 displays the same character "C" as in S11, at the position of the cursor, as illustrated in S12.

Figure 8A:
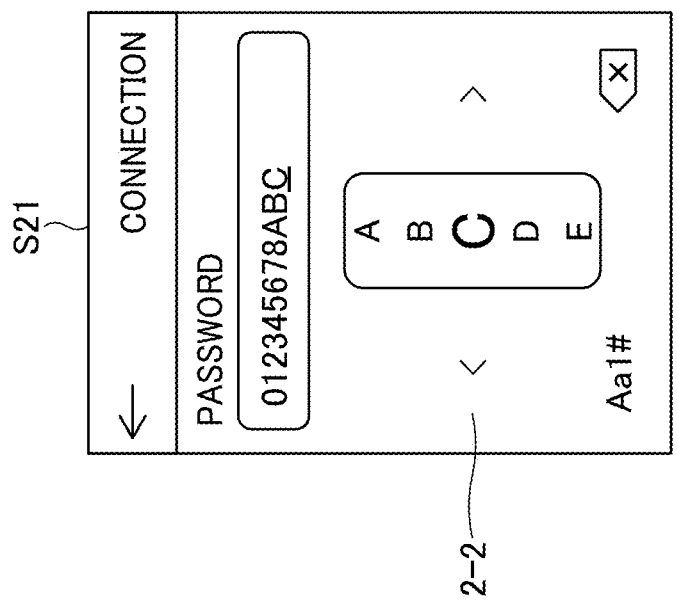
FIGS. 8A, 8B, and 8C are illustrations of the input screen of the electronic device, on which characters are displayed when a cursor is moved, according to an embodiment of the present disclosure.
Figure 8B:
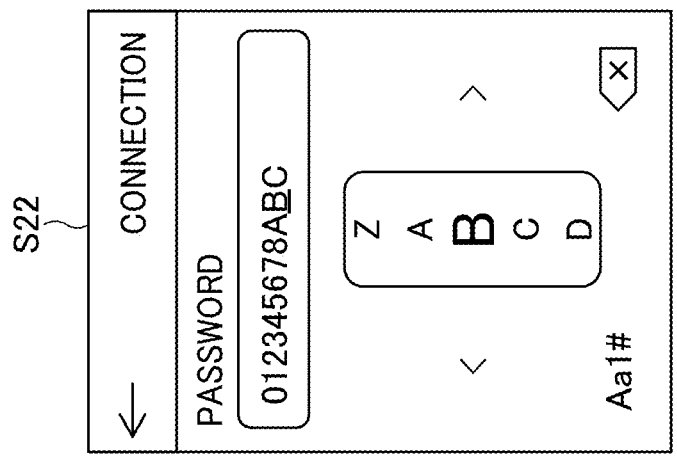
Figure 8C:
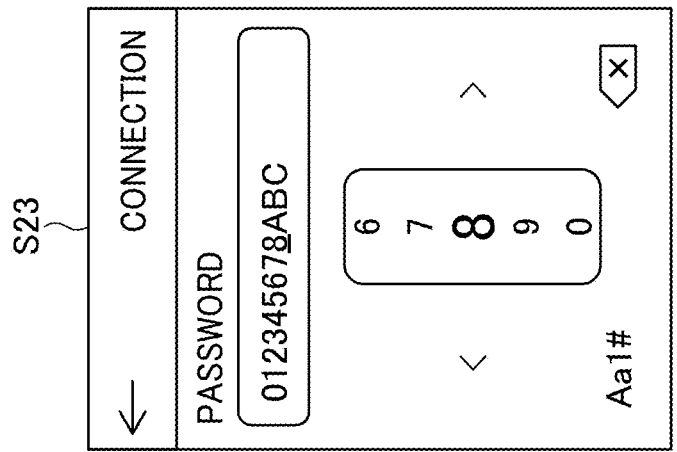

As illustrated in FIGS. 8A, 8B, and 8C, in at least one embodiment, the dial keyboard 1-1 displays, at its center, the input character to which the cursor is moved and at which the cursor is currently placed in the input area 1-2, and the displayed character is selected.

FIGS. 8A, 8B, and 8C are illustrations of the input screen of the electronic device, on which a character is displayed when a cursor is moved, according to an embodiment of the present disclosure.

In step 21 (S21) in FIG. 8A, it is detected that the left-movement key 2-2 for moving the cursor to the left is pressed.

In step 22 (S22) in FIG. 8B, the cursor is moved to the left in the input area 1-2 that displays the input character. The dial keyboard 1-1 displays the character "B" that is the input character at which the cursor is currently placed after movement in the input area 1-2.

In step 23 (S23) in FIG. 8C, it is detected that a left-movement key 2-2 for moving the cursor to the left is pressed, and the character type of the input character, at which the cursor is currently placed, is changed to another character type (from alphabet to number in the example of FIGS. 8A, 8B, and 8C). Then, the dial keyboard 1-1 changes the character type to the same character type as the character type of the input character, at which the cursor is currently placed, (i.e., the number in the example of FIGS. 8A, 8B, and 8C).

Pressing the deletion key 1-6 for deleting the character by the operator deletes an input character. In response to an operation of pressing the deletion key 1-6 by the operator, the deletion unit 1005 deletes a character at which the cursor is placed, and the cursor is moved to a position of the character one character before the deleted character (e.g., a character on the left of the deleted character in the case of horizontal writing). Hereinafter, an example of a screen when a character is deleted is described with reference to FIGS. 9A and 9B.

Figure 9A:
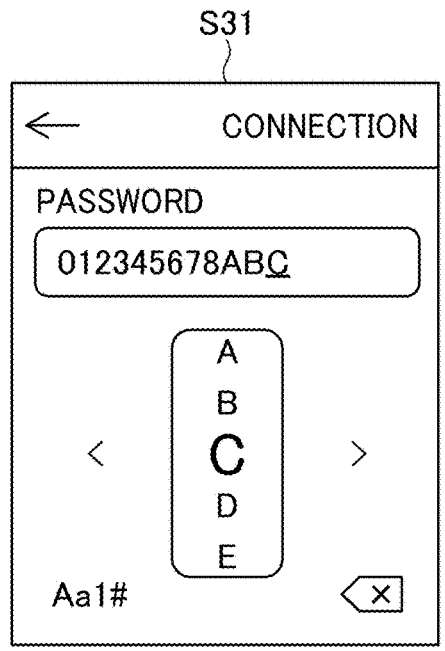
FIGS. 9A and 9B are illustrations of the input screen of the electronic device, on which a character is being deleted, according to an embodiment of the present disclosure.
Figure 9B:
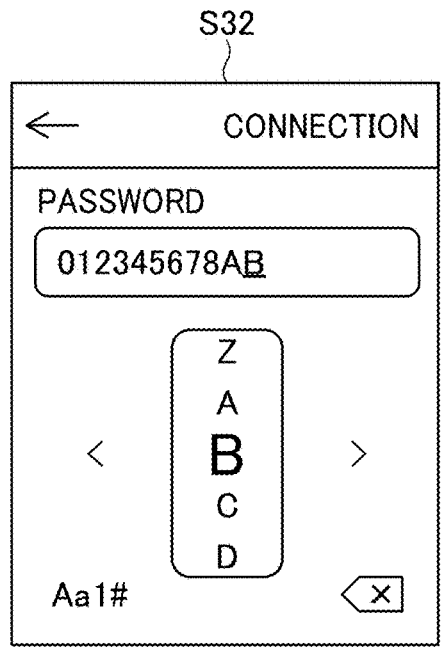

FIGS. 9A and 9B are illustrations of the input screen of the electronic device, on which a character is being deleted, according to an embodiment of the present disclosure.

In step 31 (S31) in FIG. 9A, it is detected that the deletion key is pressed. In this case, it is also detected that the cursor is at the position "C".

In step 32 (S32) in FIG. 9B, the character (i.e., "C") at which the cursor is placed in S31 is deleted. In other words, in the first embodiment, the deletion unit 1005 deletes a character at the position of the cursor. Notably, the deletion unit 1005 moves a character string positioned after the deleted character (a character string on the right of the deleted character in the case of horizontal writing), forward (i.e., to the left in the case of horizontal writing) by the number of deleted characters.

As described above, the operator uses the dial keyboard 1-1 for selecting a character and the movement key 1-4 for moving a position at which a character is input, so as to input any desired character string to the input area (an area to input characters) 1-2 where the input characters are displayed. As described above, the dial keyboard 1-1 has a smaller display area. This configuration enables input of a character string of any desired digits with ease and high operability, even in a small screen for displaying the software keyboard in a compact display panel of the electronic device (1).

Second Embodiment

Hereinafter, the second embodiment is described. The following describes the differences from the first embodiment.

Figure 11:
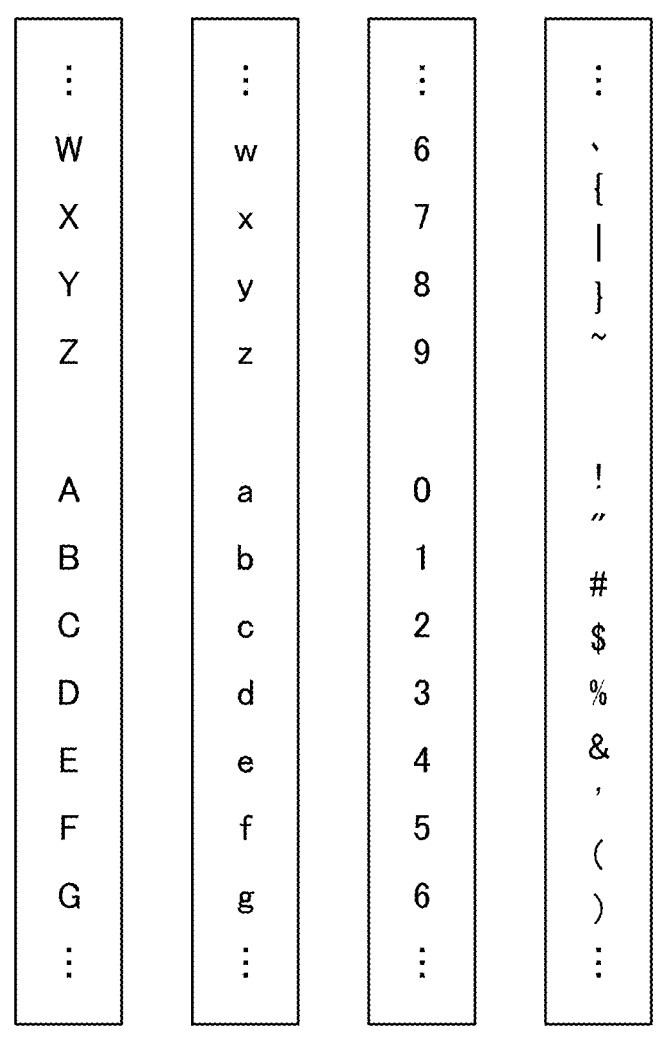

The characters displayed by the dial keyboard 1-1 have an annular structure as illustrated in FIG. 11. FIG. 11 is an illustration of characters (e.g., uppercase alphabetic characters, lowercase alphabetic characters, numbers, and symbols) arranged annularly according to an embodiment of the present disclosure. Unlike the first embodiment, in the second embodiment, a blank space is arranged between the last character and the first character of the character candidates in the dial keyboard 1-1. For alphabet characters, the characters are arranged in the order of A to Z, and the blank comes after Z and is followed by A. For the numbers, the numbers are arranged in order of 0 to 9, and the blank comes after "9" and is followed by "0". Notably, the same applies to the symbols.

Figure 10A:
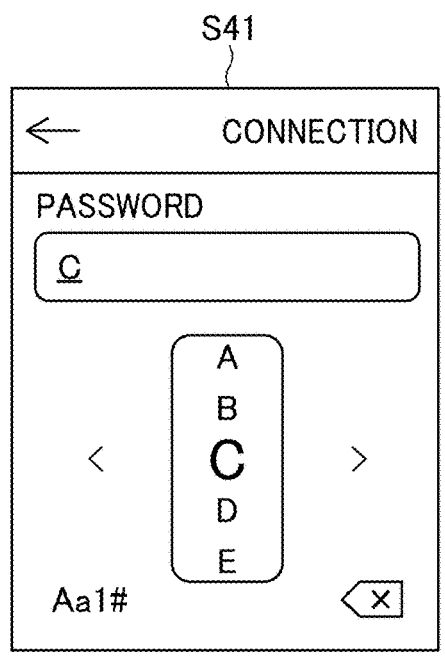
FIGS. 10A and 10B are illustrations of the input screen of the electronic device, on which a character is being input, according to an embodiment of the present disclosure.
Figure 10B:
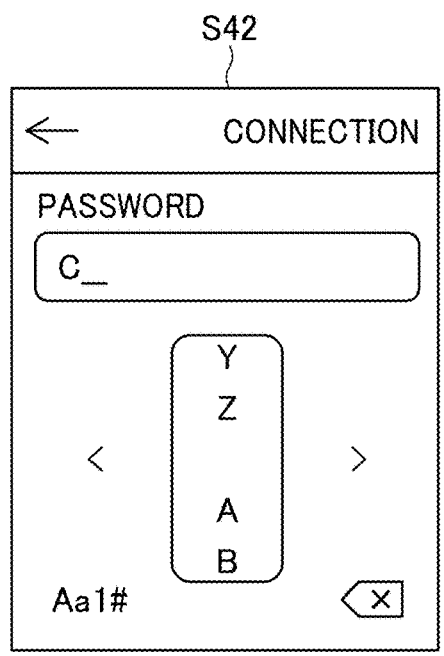

Hereinafter, characters displayed when the cursor is moved is described with reference to FIGS. 10A and 10B. In the second embodiment, the input area 1-2 displays the blank at the position to which the cursor is moved where there is a blank space for inputting a character (i.e., another character is to be input after the last character of the character string), after the previously input character has been determined and a next character is to be input. In the example of FIGS. 10A and 10B, when the cursor is moved to the right from the state of step 41 (S41) in FIG. 10A where "C" has been input, the input area 1-2 displays the blank at the position of the cursor as illustrated in step 42 (S42) of FIG. 10B. Notably, when the blank is selected, a character indicating a blank space is not to be input.

In the first embodiment, the deletion unit 1005 deletes the character at the position of the cursor, whereas in the second embodiment, the deletion unit 1005 deletes a character next to the character at the position of the cursor (i.e., the character on the left of the character at the position of the cursor in the case of horizontal writing). Hereinafter, an example of a screen when a character is deleted is described with reference to FIGS. 12A and 12B.

In step 51 (S51) in FIG. 12*a*, it is detected that the delete key is pressed. In this case, it is also detected that the cursor is at the position "C".

In step 52 (S52) in FIG. 12B, the character (i.e., "B") next to the character at the position of the cursor in S51 is deleted. Notably, the deletion unit 1005 moves a character string positioned after the deleted character (a character string on the right of the deleted character in the case of horizontal writing), forward (i.e., to the left in the case of horizontal writing) by the number of deleted characters.

In the first embodiment and the second embodiment, a preferable method may be selected for the user interface of the product. The first embodiment enables deletion of the final character with ease, and the second embodiment enables the same operability as the backspace key of personal computers (PCs) or the deletion key of the general-purpose software keyboard in the smartphone.

The above-described embodiments provides a software keyboard that enables input of a character string of any desired digits with ease and high operability, even in a small screen for displaying the software keyboard in a compact display panel of the electronic device (1). For example, in a case of inputting a password to connect a digital camera with the Wi-Fi router, the embodiments enables input of the password with high operability even in a compact display panel of the digital camera and a small screen for the software keyboard.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

The invention claimed is:

1. An electronic device comprising:
an input screen including:
a software keyboard to sequentially display multiple characters and select a character of the multiple characters in accordance with an operation of an operator on the software keyboard, the multiple characters which are being displayed are displayed in a line, with each of the multiple characters adjacent to no more than two others of the multiple characters;
an input area into which the character selected and input from the software keyboard by the operator is input at an input position; and
at least two movement keys at opposite sides of the line for allowing the operator to move the input position at which the selected character is to be displayed in the input area to determine the input position,
wherein the input area displays the selected character at the input position determined based on an operation on one of the movement keys, in response to the selection of the selected character.

2. The electronic device according to claim 1, wherein:
the software keyboard includes multiple characters arranged in a predetermined order,
the software keyboard sequentially displays the multiple characters in accordance with the operation by the operator on the software keyboard, and
in response to the operation on one of the movement keys to cause movement of the input position of the input area from a first input position to a second input position which is adjacent to the first input position, a character displayed at a selection position of the software keyboard is settled as a character at the first input position.

3. The electronic device according to claim 1, wherein:
in response to the operation on one of the movement keys to cause movement of the input position from a first display position to a second display position which is adjacent to the second display position, the first display position is settled to be a character to be selected at a selection position of the software keyboard,
the character displayed at the selection position of the software keyboard is a same character as the character which has been settled as the character to be selected as an input character at the first display position of the input area, and the character displayed at the selection position of the software keyboard is displayed with different characteristics than characters of the software keyboard that are not at the selection position of the software keyboard.

4. The electronic device according to claim 1,
wherein the input screen further includes a switch key to switch a character type of the multiple characters on the software keyboard.

5. The electronic device according to claim 1,
wherein the input screen further includes a confirmation key to confirm a currently-selected character on the software keyboard, as a last character to be input to the input area.

6. The electronic device according to claim 1,
wherein the input screen further includes a deletion key to delete a character input at the input position determined in response to an operation on one of the movement keys.

7. The electronic device according to claim 1, wherein:
the software keyboard comprises a dial keyboard.

8. The electronic device according to claim 1, wherein:
the multiple characters of the software keyboard are annularly arranged.

9. The electronic device according to claim 1, wherein:
the software keyboard and the at least two movement keys are within a width range of the input area.

10. The electronic device according to claim 1, wherein:
the line is orthogonal to a direction in which the at least two movement keys are arranged.

11. A method for controlling display, the method comprising:
displaying an input screen including a software keyboard to sequentially display multiple characters and select a character of the multiple characters in accordance with an operation of an operator on the software keyboard, the multiple characters which are being displayed are displayed in a line, with each of the multiple characters adjacent to no more than two others of the multiple characters, an input area into which the character selected and input from the multiple characters is input at an input position, and at least two movement keys at opposite sides of the line for allowing the operator to move the input position at which the selected character is to be input in the input area to determine the input position;
sequentially displaying the multiple characters for selection by the operator on the software keyboard, according to the operation on the software keyboard by the operator; and
in response to a selection of a character from the multiple characters by the operator, displaying the selected character at the input position determined in response to an operation on one of the movement keys.

12. The method according to claim 11, further comprising:
displaying a character to be selected at a selection position of the software keyboard, and
in response to the operation on one of the movement keys to cause movement of the input position from a first display position to a second display position which is adjacent to the first display position, settling at the first display the character to be selected at the selection position of the software keyboard.

13. The method according to claim 11, further comprising:
in response to the operation on one of the movement keys to cause movement of the input position from a first display position to a second display position which is adjacent to the second display position, settling the first display position to be the character to be selected at a selection position of the software keyboard, and displaying at the second position a same character as the character having been displayed at the first display position in the input area.

14. The method according to claim 11, further comprising:
displaying, on the input screen, a switch key to switch a character type of the multiple characters on the software keyboard.

15. The method according to claim 11, further comprising:
displaying, on the input screen, a confirmation key to confirm a currently-selected character on the software keyboard, as a last character to be input to the input area.

16. The method according to claim 11, further comprising:
displaying a deletion key to delete a character input at the input position determined in response to an operation on one of the movement keys.

17. A non-transitory recording medium storing a computer-readable code for controlling a computer system to carry out a method for controlling display, the method including:
displaying an input screen including a software keyboard to sequentially display multiple characters and select a character of the multiple characters in accordance with an operation of an operator on the software keyboard, the multiple characters which are being displayed are displayed in a line, with each of the multiple characters adjacent to no more than two others of the multiple characters, an input area into which the character selected and input from the multiple characters is input at an input position, and at least two movement keys at opposite sides of the line for allowing the operator to move the input position at which the selected character is to be input in the input area to determine the input position;
sequentially displaying the multiple characters for selection by the operator on the software keyboard, according to the operation on the software keyboard by the operator; and
in response to a selection of a character from the multiple characters by the operator, displaying the selected character at the input position determined in response to an operation on one of the movement keys.

18. The non-transitory recording medium according to claim 17, further comprising computer readable code for controlling the computer system to:

displaying a character to be selected at a selection position of the software keyboard, and in response to the operation on one of the movement keys to cause movement of the input position from a first display position to a second display position which is adjacent to the first display position, settling at the first display position the character to be selected at the selection position of the software keyboard.

19. The non-transitory recording medium according to claim 17, further comprising computer readable code for controlling the computer system to:

in response to the operation on one of the movement keys to cause movement of the input position from a first display position to a second display position which is adjacent to the second display position, settling the first display position to be the character to be selected at a selection position of the software keyboard, and displaying at the second position a same character as the character having been displayed at the first display position in the input area.

20. The non-transitory recording medium according to claim 17, further comprising:

displaying, on the input screen, a switch key to switch a character type of the multiple characters on the software keyboard.

21. The non-transitory recording medium according to claim 17, further comprising:

displaying, on the input screen, a confirmation key to confirm a currently-selected character on the software keyboard, as a last character to be displayed to the input area.

22. The non-transitory recording medium according to claim 17, further comprising:

displaying a deletion key to delete a character displayed at the input position determined in response to an operation on one of the movement keys.

\* \* \* \* \*